US008315200B2

(12) United States Patent
Ide

(10) Patent No.: US 8,315,200 B2
(45) Date of Patent: Nov. 20, 2012

(54) TRANSMISSION DEVICE, TRANSMISSION METHOD, RECEPTION DEVICE, AND COMMUNICATION SYSTEM

(75) Inventor: Naoki Ide, Tokyo (JP)

(73) Assignee: Sony Corporation, Tokyo (JP)

( * ) Notice: Subject to any disclaimer, the term of this patent is extended or adjusted under 35 U.S.C. 154(b) by 168 days.

(21) Appl. No.: 12/041,851

(22) Filed: Mar. 4, 2008

(65) Prior Publication Data

US 2008/0219179 A1 Sep. 11, 2008

(30) Foreign Application Priority Data

Mar. 5, 2007 (JP) ................................ P2007-054174

(51) Int. Cl.
*H04B 7/185* (2006.01)

(52) U.S. Cl. ....................................... 370/317; 455/63.1
(58) Field of Classification Search .................. 455/512, 455/522; 370/314, 317
See application file for complete search history.

(56) References Cited

U.S. PATENT DOCUMENTS

| | | | | |
|---|---|---|---|---|
| 5,937,016 | A * | 8/1999 | Choi | 375/341 |
| 6,393,045 | B1 * | 5/2002 | Belcher et al. | 375/130 |
| 2002/0044610 | A1 * | 4/2002 | Jones | 375/261 |
| 2005/0008157 | A1 * | 1/2005 | Hjelm | 380/252 |
| 2007/0165845 | A1 * | 7/2007 | Ye et al. | 380/30 |
| 2008/0107268 | A1 * | 5/2008 | Rohde et al. | 380/263 |

FOREIGN PATENT DOCUMENTS

| | | |
|---|---|---|
| JP | 1974-106708 | 10/1974 |
| JP | 2001-094536 | 4/2001 |
| JP | 2004-342121 | 12/2004 |
| JP | 2005-045305 | 2/2005 |
| WO | WO 2006/090856 | 8/2006 |
| WO | WO 2007/046302 | 4/2007 |

OTHER PUBLICATIONS http://www.ietf.org/rfc/rfc2313.txt?number=2313, "PKCS #1: RSA Encryption", Version 1.5, B. Kaliski, RSA Laboratories East, Mar. 1998.

http://www.ietf.org/rfc/rfc3268.txt?number=3268 Advanced Encryption Standard (AES) Ciphersuites for Transport Layer Security (TLS), P, Chown, Skygate Technology, Jun. 2002.

Communication from Japanese Patent Office in corresponding Japanese Patent Application No. 2007-054174 and English translation dated Nov. 10, 2008, 7 pages.

* cited by examiner

*Primary Examiner* — Mark Rinehart
*Assistant Examiner* — Matthew Hopkins
(74) *Attorney, Agent, or Firm* — Finnegan, Henderson, Farabow, Garrett & Dunner, L.L.P.

(57) ABSTRACT

A communication system includes: a transmission device configured to transmit predetermined information; and a reception device configured to receive the predetermined information; wherein the transmission device includes an encoding unit configured to encode the information such that the error rate of the information in the case of a signal-to-noise ratio being greater than a first signal-to-noise ratio is at or below a predetermined value, and the error rate in the case of a signal-to-noise ratio being smaller than a second signal-to-noise ratio becomes 1/2; and wherein the reception device includes a decoding unit configured to decode the information subjected to encoding by the encoding unit.

16 Claims, 11 Drawing Sheets

FIG. 8

| | i | 1 | 2 | 3 | 4 | 5 | 6 | 7 | 8 | 9 | 10 | 11 |
|---|---|---|---|---|---|---|---|---|---|---|---|---|
| | BEFORE AMPLIFICATION CODING d(i) | | 0 | 0 | 1 | 1 | 1 | 1 | 0 | 0 | 0 | |
| | AFTER AMPLIFICATION CODING t(i) | | | 0 | 1 | 0 | 0 | 0 | 0 | 0 | 0 | |
| NO ERROR | BEFORE AMPLIFICATION CODING r(i) | | | 0 | 1 | 0 | 0 | 0 | 1 | 0 | 0 | |
| NO ERROR | AFTER AMPLIFICATION CODING s(i) | | 0 | 0 | 1 | 1 | 1 | 1 | 0 | 0 | 0 | |
| WITH ERROR | BEFORE AMPLIFICATION CODING r(i) | | | 0 | 0 (ERROR OCCURS) | 0 | 0 | 0 | 0 (ERROR OCCURS) | 0 | 0 | |
| WITH ERROR | AFTER AMPLIFICATION CODING s(i) | | 0 | 0 | 0 | 0 | 0 | 0 | 0 | 0 | 0 | |

TRANSMISSION DEVICE, TRANSMISSION METHOD, RECEPTION DEVICE, AND COMMUNICATION SYSTEM

CROSS REFERENCES TO RELATED APPLICATIONS

The present invention contains subject matter related to Japanese Patent Application JP 2007-054174 filed in the Japanese Patent Office on Mar. 5, 2007, the entire contents of which are incorporated herein by reference.

BACKGROUND OF THE INVENTION

1. Field of the Invention

The present invention relates to a transmission device, a transmission method, a reception device, and a communication system, and particularly relates to a transmission device, a transmission method, a reception device, and a communication system whereby wiretapping by a third party can be prevented by increasing the error rate of a reception signal to ½ even in the case of a minute interference signal being included.

2. Description of the Related Art

Code has been known as a method for enhancing the confidentiality of information with a predetermined communication path. Code is classified roughly into classic code not employing a key for encryption and decryption (deciphering), and modern code employing a key. Further, the modern code employing a key is classified roughly into the common key encryption system employing a common key, and the public key encryption system employing a public key. As for the common key encryption system, for example, DES, Triple DES, AES, and so forth have been known, and as for the public key encryption system, for example, RSA, and so forth have been known (e.g., see RFC2313, IETF (The Internet Engineering Task Force), Internet <URL:http://www.ietf.org/rfc/rfc2313.txt?number=2313>, and RFC3268, IETF (The Internet Engineering Task Force), Internet <URL:http://www.ietf.org/rfc/rfc3268.txt?number=3268>).

With the common key encryption system, the transmission side and reception side have a common key, and the transmission side encrypts information using this common key to transmit this, and the reception side decrypts the encrypted information using the common key. Accordingly, the common key encryption system is a system for preventing the others (malicious third party) from deciphering information by only the transmission side and reception side sharing the common key.

On the other hand, with the public key encryption system, the reception side possesses a secret key, and also a public key generated from the secret key is provided to the transmission side. The transmission side encrypts information using the public key to transmit this, and the reception side decrypts the encrypted information using the secret key. Accordingly, the public key encryption system is a system for preventing the others from deciphering information by employing a public key difficult to assume its secret key.

With either the common key encryption system or public key encryption system, in order to subject information to confidentiality in a more secure manner, it becomes important how the transmission side and reception side can share the key information in a secure manner. For example, it is desirable to ensure a dedicated secure communication path in the case of providing the key information to the other party, but actually it is difficult to ensure such a communication path. Also, it is more difficult to ensure the dedicated communication path whenever the key information is updated.

Also, using the same communication path as a communication path for transmitting ordinary information leads to a problem since only the same safety as to the transmitted key information as the safety as to information not encrypted can be ensured.

Thus, it is difficult for only a sending person and receiving person to share the key information in a secure manner, and even if the sending person and receiving person can share the key information, the key information may be stolen with certain means in some cases.

SUMMARY OF THE INVENTION

To this end, for example, in the case of transmitting the key information via a communication path as a transmission signal, let us consider that a transmission signal is buried by transmitting an interference signal on a communication path, or the like, thereby preventing the third party from wiretapping, based on a feature wherein the smaller a signal-to-noise ratio becomes the greater an error rate becomes.

In this case, a state in which a transmission signal is buried completely is when an error rate becomes ½, so it is necessary to increase an interference signal until the error rate becomes ½, but on the other hand, if we consider decryption, it is desirable to make the interference signal as small as possible.

It has been found desirable to enable wiretapping by a third party to be prevented, by increasing the error rate of a reception signal to ½ which includes at least a minute interference signal.

A communication system according to an embodiment of the present invention is a communication system including: a transmission device configured to transmit predetermined information; and a reception device configured to receive the predetermined information; wherein the transmission device includes an encoding unit configured to encode the information such that the error rate of the information in the case of a signal-to-noise ratio being greater than a first signal-to-noise ratio is at or below a predetermined value, and the error rate in the case of a signal-to-noise ratio being smaller than a second signal-to-noise ratio becomes 1/2; and wherein the reception device includes a decoding unit configured to decode the information subjected to encoding by the encoding unit.

With the communication system according to this configuration, at the transmission device the information is encoded such that the error rate of the information in the case of a signal-to-noise ratio being greater than the first signal-to-noise ratio is at or below the predetermined value, and the error rate in the case of a signal-to-noise ratio being smaller than the second signal-to-noise ratio becomes 1/2, at the reception device the encoded information is decoded.

A transmission device according to an embodiment of the present invention includes an encoding unit configured to encode transmission information such that the error rate of the transmission information in the case of a signal-to-noise ratio being greater than a first signal-to-noise ratio is at or below a predetermined value, and the error rate in the case of a signal-to-noise ratio being smaller than a second signal-to-noise ratio becomes 1/2.

The encoding unit may include: an error-amplifying encoding unit configured to perform amplification encoding for amplifying the error rate to ½; and an error-correcting encoding unit configured to perform error encoding whereby the error rate in the case of a signal-to-noise ratio being greater than the first signal-to-noise ratio is at or below the predetermined value, and change in an error rate as to deterioration of a signal-to-noise ratio in the case of a signal-to-noise ratio being at or below the first signal-to-noise ratio is greater than that in the case of performing no encoding, and the error rate thereof approximates the error rate in the case of performing no encoding in accordance with the deterioration of a signal-to-noise ratio.

The error-amplifying encoding unit may perform amplification encoding in increments of block with a predetermined number of bits as a block.

The error-amplifying encoding unit may determine the bits of the number of bits equivalent to an encoding rate of the number of all the bits encoded based on a combination of a bit value which is at or above 2 of said transmission information.

The encoding rate may be set to 1.

The error-amplifying encoding unit may perform the amplification encoding by subjecting input of the one bit to convolutional encoding for outputting one bit.

The error-amplifying encoding unit may perform the amplification encoding by outputting the exclusive OR of two bits input in a time-oriented manner.

The transmission device may further include a rearranging unit configured to rearrange the bit stream obtained by the encoding unit encoding the information.

The error-correcting encoding unit may perform correction encoding of which the encoding rate is smaller than 1.

The error-correcting encoding unit may perform correction encoding using an encoding system of a turbo code or LDPC code.

A transmission method according to an embodiment of the present invention includes the step of: encoding transmission information such that the error rate of the transmission information in the case of a signal-to-noise ratio being greater than a first signal-to-noise ratio is at or below a predetermined value, and the error rate in the case of a signal-to-noise ratio being smaller than a second signal-to-noise ratio becomes 1/2.

With this configuration, the transmission information is encoded such that the error rate of transmission information in the case of a signal-to-noise ratio being greater than a first signal-to-noise ratio is at or below a predetermined value, and the error rate in the case of a signal-to-noise ratio being smaller than a second signal-to-noise ratio becomes 1/2.

According to this configuration, a transmission signal can be transmitted, which increases the error rate of a reception signal to ½ which includes at least a minute interference signal.

A reception device according to an embodiment of the present invention includes a decoding unit configured to decode transmission information encoded such that the error rate of the transmission information in the case of a signal-to-noise ratio being greater than a first signal-to-noise ratio is at or below a predetermined value, and the error rate in the case of a signal-to-noise ratio being smaller than a second signal-to-noise ratio becomes 1/2.

With this configuration, transmission information encoded such that the error rate of the transmission information in the case of a signal-to-noise ratio being greater than a first signal-to-noise ratio is at or below a predetermined value, and the error rate in the case of a signal-to-noise ratio being smaller than a second signal-to-noise ratio becomes 1/2, is decoded.

According to this configuration, a reception signal of which the error rate becomes ½ can be received by the reception signal including a minute interference signal, and decoded.

According to the above-described configurations, wiretapping by a third party can be prevented by increasing the error rate of a reception signal to ½ which includes at least a minute interference signal.

BRIEF DESCRIPTION OF THE DRAWINGS

FIG. 8 is a diagram describing the operation and advantage of the error-amplifying encoder and error-amplifying decoder;

DESCRIPTION OF THE PREFERRED EMBODIMENTS

Figure 1:
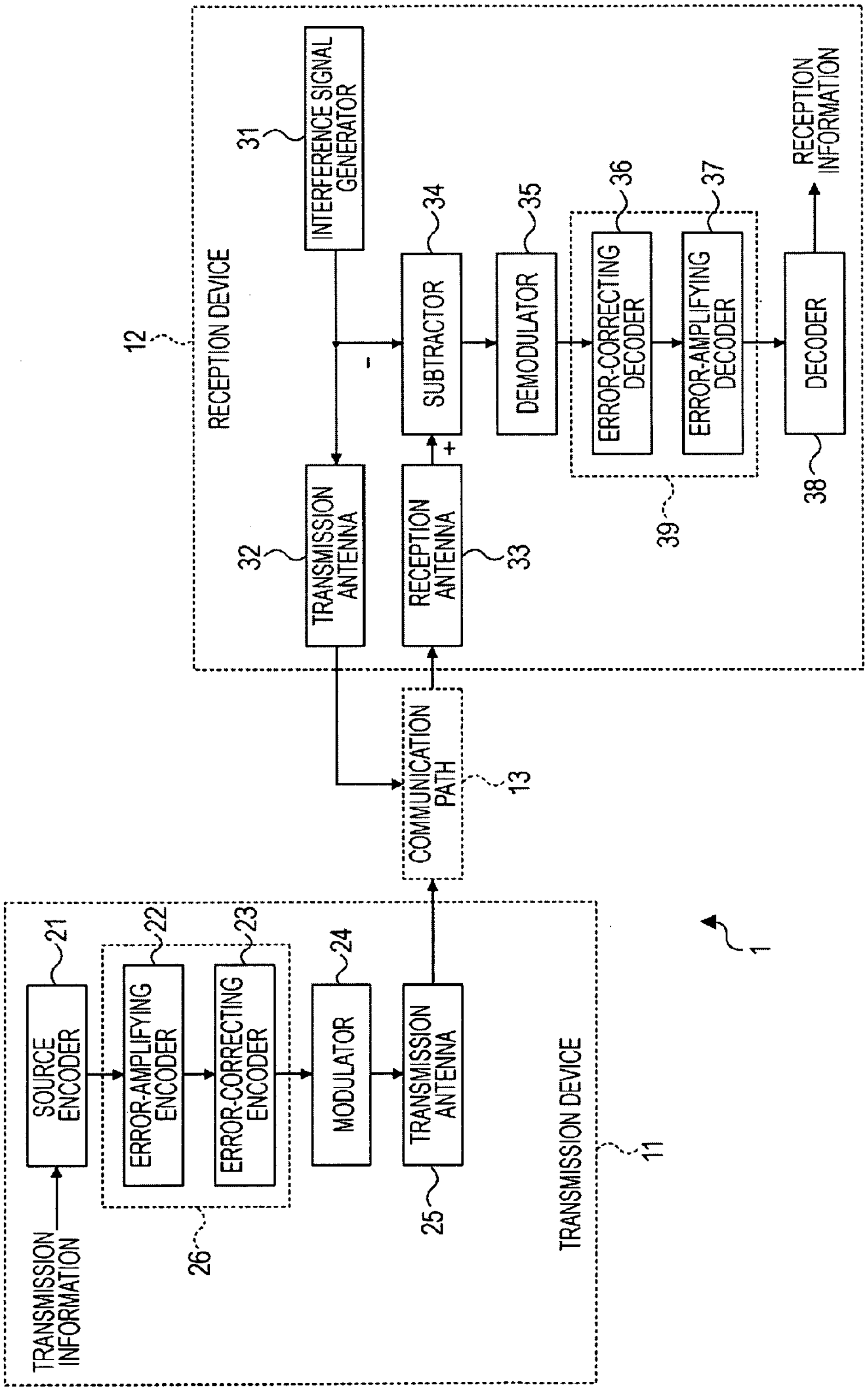
FIG. 1 is a block diagram illustrating a configuration example of an embodiment of a communication system to which the present invention is applied.

Before describing embodiments of the present invention, the correspondence between the features of the claims and the specific elements disclosed in embodiments of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to the other features of the claims.

A communication system according to a first embodiment of the present invention is a communication system (e.g., communication system 1 in FIG. 1) including: a transmission device (e.g., transmission device 11 in FIG. 1) configured to transmit predetermined information; and a reception device (e.g., reception device 12 in FIG. 1) configured to receive the predetermined information; wherein the transmission device includes an encoding unit (e.g., correction information encoder 26 in FIG. 1) configured to encode the information such that the error rate of the information in the case of a signal-to-noise ratio being greater than a first signal-to-noise ratio is at or below a predetermined value, and the error rate in the case of a signal-to-noise ratio being smaller than a second signal-to-noise ratio becomes 1/2; and wherein the reception device includes a decoding unit (e.g., correction information decoder 39 in FIG. 1) configured to decode the information subjected to encoding by the encoding unit.

A transmission device (e.g., transmission device 11 in FIG. 1) according to a second embodiment of the present invention includes an encoding unit (e.g., correction information encoder 26 in FIG. 1) configured to encode transmission information such that the error rate of the transmission information in the case of a signal-to-noise ratio being greater than a first signal-to-noise ratio is at or below a predetermined value, and the error rate in the case of a signal-to-noise ratio being smaller than a second signal-to-noise ratio becomes 1/2.

The encoding unit can include: an error-amplifying encoding unit (e.g., error-amplifying encoder 22 in FIG. 1) configured to perform amplification encoding for amplifying the error rate to ½; and an error-correcting encoding unit (e.g., error-correcting encoder 23 in FIG. 1) configured to perform error encoding whereby the error rate in the case of a signal-to-noise ratio being greater than the first signal-to-noise ratio is at or below the predetermined value, and change in an error rate as to deterioration of a signal-to-noise ratio in the case of a signal-to-noise ratio being at or below the first signal-to-noise ratio is greater than that in the case of performing no encoding, and the error rate thereof approximates the error rate in the case of performing no encoding in accordance with the deterioration of a signal-to-noise ratio.

Description will be made below regarding embodiments of the present invention with reference to the drawings.

FIG. 1 illustrates a configuration example of an embodiment of a communication system to which the present invention is applied.

The communication system 1 in FIG. 1 is configured of a transmission device 11 for transmitting predetermined information, a reception device 12 for receiving the predetermined information transmitted from the transmission device 11, and a communication path 13 for transferring the predetermined information between the transmission device 11 and reception device 12.

With the communication system 1, while the transmission device 11 is transmitting the predetermined information, a predetermined interference signal is output (transmitted) from the reception device 11 to the communication path 13. The reception device 12 removes the interference signal output by itself from the received reception signal, whereby the predetermined information from the transmission device 11 can be obtained. On the other hand, the interference signal is superimposed on the transmission signal from the transmission device 11, so even if the third party other than the sending person who is the user of the transmission device 11 and the receiving person who is the user of the reception device 12 receives the signal on the communication path 13, the third party cannot decipher the information thereof. That is to say, with the communication system 1, the secrecy of the predetermined information is realized between the transmission side and reception side. Note that the type of information to be transmitted/received by employing this system may be any type. For example, in the case of transmitting/receiving key information by employing this technique, the key information can be shared between the transmission device 11 and reception device 12. In particular, with various types of systems such as a wireless LAN (Local Area Network), electrostatic-field communication, and further UWB (Ultra Wide Band), secure sharing of key information includes important implications, so the meaning of applying the present invention is extremely great. Hereafter, description will be made of a specific configuration and operation for realizing such a function.

The transmission device 11 is configured of a source encoder 21, an error-amplifying encoder 22, an error-correcting encoder 23, a modulator 24, and a transmission antenna 25. The error-amplifying encoder 22 and error-correcting encoder 23 make up a correction information encoder 26.

Transmission information to be transmitted to the reception device 12 is supplied from another device or another unshown block within the transmission device 11 to the source encoder 21. This transmission information is information which should be kept secret.

The source encoder 21 executes source encoding processing wherein the transmission information is encoded using a predetermined encoding system. According to this source encoding processing, the transmission information is converted into a predetermined bit stream (hereafter, referred to as an information bit stream as appropriate), and this is supplied to the error-amplifying encoder 22.

In the case of the error rate of a decoded bit stream at the reception device 12 being greater than a predetermined error rate, the error-amplifying encoder 22 executes error-amplification encoding processing for increasing the error rate thereof to ½. Therefore, with the error-amplification encoding processing, an encoding rate does not need to be a value smaller than 1, and rather may be a value at or above 1.

Accordingly, with the present embodiment, as the error-amplifying encoder 22, an arrangement is employed wherein as described later with reference to FIG. 3, the configuration of a convolutional encoder is employed, whereby one bit determined with a combination of the bit values of two bits before error-amplifying encoding is output as to input of one bit, i.e., an encoding rate becomes 1.

In the case of the error rate of a decoded bit stream being at or below a predetermined error rate, it is desirable not to increase the error rate thereof. Accordingly, an arrangement is made wherein the error-amplifying encoder 22 subjects an input bit stream to error-amplification encoding processing for each predetermined length block.

Note that in the case of an encoding rate being at or below 1, the error-amplifying encoder 22 performs encoding such that, of the number of all the encoded bits, the bit values of the number of bits corresponding to the encoding rate are determined with a combination of the bit values of two bits or more before the error-amplifying encoding.

The error-amplifying encoder 22 supplies a bit stream after the error-amplification encoding processing (hereafter, referred to as an error-amplified bit stream) to the error-correcting encoder 23.

The error-correcting encoder 23 executes error-correction encoding processing to approximate the error rate of a decoded bit stream to zero. That is to say, the error-correction encoding processing executed by the error-correcting encoder 23 is the same processing as the error-correction encoding processing performed traditionally. Accordingly, as the error-correcting encoding system of the correction encoding processing, Reed Solomon code, BCH code, Hamming code, turbo code, LDP (Low Density Parity-check), or the like can be employed.

The error-correcting encoding system such as Reed Solomon code, BCH code, Hamming code, or the like is an encoding system wherein in the case of a decoded bit stream being smaller than a predetermined error rate, the error rate thereof is approximated to zero.

Also, the error-correcting encoding system such as turbo code, LDPC code, or the like is an encoding system wherein in the case of the signal-to-noise ratio (SNR) of the reception signal received by the reception device 12 being greater than a predetermined signal-to-noise ratio, the error rate a decoded bit stream is approximated to zero.

Turbo code and LDPC code have a property wherein in the case of the signal-to-noise ratio of a received signal being greater than a predetermined signal-to-noise ratio close to Shannon limit, the error rate of a decoded bit stream is extremely low, and in the case of at or below the predetermined signal-to-noise ratio, the error rate of a decoded bit stream suddenly becomes great, as compared with Reed Solomon code, BCH code, Hamming code, and so forth. This property is still stronger with turbo convolutional code of turbo code, and irregular LDPC code of LDPC code. Turbo product code, regular LDPC, and so forth next have such a property as described above.

Accordingly, with the present embodiment, as described later with reference to FIG. 4, as the error-correcting encoder 23, an encoder for performing turbo convolutional coding is employed.

The bit stream subjected to the error-correction encoding processing by the error-correcting encoder 23 (hereafter, referred to a transmitted bit stream as appropriate) is supplied to the modulator 24. This error-correction encoding processing has an aim for improving the accuracy of information, so differs from the case of the error-amplifying encoder 22, and it is desirable to set an encoding rate to a value smaller than 1.

The modulator 24 modulates the transmitted bit stream from the error-correcting encoder 23 using a predetermined modulation system, and supplies the transmission signal obtained as a result thereof to the transmission antenna 25. The transmission signal after modulation may be a baseband signal, or may be a signal employing a carrier with a predetermined frequency depending on a band limit. In the case of employing a carrier, a baseband signal is subjected to up-conversion to the frequency of a carrier (carrier frequency). As for a modulation system employing a carrier, for example, ASK (Amplitude Shift Keying) such as OSK (On-Off Shift Keying) or the like, PSK (Phase Shift Keying) such as BPSK (Binary Phase Shift Keying), QPSK (Quadrature Phase Shift Keying) or the like, or QAM (Quadrature Amplitude Modulation) such as 16QAM, 64QAM, 256QAM or the like, or the like may be employed. Also, in the case of the transmission signal being a baseband signal, the modulator 24 can be omitted except for a signal to be subjected to run-length restrictions.

With the transmission device 11, an encryptor for subjecting an information bit stream to encryption processing, or a scrambler for subjecting an information bit stream to scramble processing can be provided as necessary.

Examples of the communication path 13 include an electrostatic-field communication path which employs an electric field and potential, and an electromagnetic-field communication path which employs a magnetic field, which are employed for proximity communication wherein the transmission side and reception side come close to each other to perform wireless communication. Also, the communication path 13 may be a communication path having no strong directivity such as wireless waves. That is to say, the communication path 13 needs to be a communication path wherein the signal at the transmission side and the signal at the reception side are readily superimposed, and accordingly, distinction cannot be readily made regarding whether the signal is the signal from the transmission side or the signal from the reception side.

The reception device 12 is configured of an interference signal generator 31, a transmission antenna 32, a reception antenna 33, a subtractor 34, a demodulator 35, an error-correcting decoder 36, an error-amplifying decoder 37, and a decoder 38. The error-correcting decoder 36 and error-amplifying decoder 37 make up a correction information decoder 39.

The interference signal generator 31 generates an interference signal which serves as noise for interfering with wire-tapping of the transmission signal by the third party. As the interference signal generator 31, for example, there are a case of providing a circuit for generating AWGN (Additive White Gaussian Noise), and a case of providing a circuit for generating the bit stream of a random number (pseudo-random number), and signals generated from those circuits are employed as interference signals.

The interference signal employing AWGN is particularly effective in the case of the transmission signal being a baseband signal. In order to generate AWGN, for example, an analog circuit employing thermal noise on circuits can be employed. In this case, the interference signal generator 31 subjects thermal noise to filtering to a desired band, and then amplifies this, and digitizes a noise signal using an AD converter or the like as necessary.

Also, it is also possible to generate AWGN using a digital circuit. As an algorithm for generating AWGN, for example, there are Box-Muller algorithm, Ziggurat algorithm, Wallace algorithm, and so forth, but configuring such an algorithm with logic circuits enables a digital circuit to generate AWGN. The AWGN of a digital signal is converted into an analog signal with a DA converter or the like.

On the other hand, an interference signal employing the bit stream of a pseudo-random number is effective for both of the case of the transmission signal being a baseband signal, and the case of the transmission signal being a signal employing a carrier. Note that in the case of the transmission signal being a signal employing a carrier, before input into the transmission antenna 32, the reception device 12 subjects the interference signal from the interference signal generator 31 to the same modulation as the modulation system performed at the transmission device 11, or at least modulation employing the same frequency as that of a carrier, whereby an arrangement sharing with the transmission device 11 can be realized.

With the interference signal employing the bit stream of a pseudo-random number, the clock frequency of the bit stream of a pseudo-random number is set to the same as the clock frequency of the transmitted bit stream which the transmission device 11 transmits, whereby distinction between the bit stream of a pseudo-random number and the transmitted bit stream can be prevented. Also, setting the clock frequency of the bit stream of a pseudo-random number to a frequency greater than the clock frequency of the transmitted bit stream, e.g., the frequency of a carrier, enables the function as noise as to the transmission information to be improved.

The interference signal from the interference signal generator 31 is output to the communication path 13 via the transmission antenna 32. The interference signal needs to be a size equivalent to a level which does not allow the third party to restore the transmission signal, so the size of the interference signal is measured beforehand, and the interference signal adjusted to a predetermined size is output to the communication path 13.

Note that the interference signal may be the signal of AWGN, or may be a signal other than the bit stream of a pseudo-random number, as long as the interference signal has been known at the reception side, and makes it impossible for the transmission side and the third party to distinguish the transmission signal.

The reception antenna 33 receives the reception signal transferred on the communication path 13, and supplies this to the subtractor 34. This signal is a signal wherein the transmission signal output from the transmission device 11 and the interference signal output from the reception device 12 are superimposed at the communication path 13.

The transmission antenna 32 and reception antenna 33 may be a common antenna. Also, the transmission antenna 32 can be the same type as the transmission antenna 25 of the transmission device 11.

The reception signal is supplied from the reception antenna 33 to the subtractor 34, and also the interference signal from the interference signal generator 31 is supplied to the subtractor 34. The subtractor 34 removes the interference signal included in the reception signal supplied from the reception antenna 33, and supplies the signal after removal to the demodulator 35.

With the subtractor 34, the interference signal is supplied from two routes of a first route directly from the interference signal generator 31, and a second route passing through the transmission antenna 32, communication path 13, and reception antenna 33, but the interference signal passing through the communication path 13 is delayed as compared with the interference signal supplied directly from the interference signal generator 31. Also, the interference signal included in the reception signal differs from the interference signal itself generated by the interference signal generator 31 in respect of the amplitude and frequency property and so forth due to various types of influence existing on the communication path 13. Accordingly, with the route from the interference signal generator 31 to the subtractor 34, or the route from the reception antenna 33 to the subtractor 34, a delay element, filter, and amplifier (not shown) for adjusting the synchronization, frequency property, amplitude, and the like of both of the interference signals are disposed as appropriate.

The demodulator 35 demodulates the signal from the subtractor 34 using the system corresponding to the modulation system performed at the modulator 24 of the transmission device 11. The reception bit stream as a result of demodulation is supplied to the error-correcting decoder 36. Note that in the case of the reception signal being a baseband signal, the demodulator 35 can be omitted except for the case of modulation such as run-length restrictions being performed. Also, in the case of the reception signal being a signal employing a carrier, the demodulator 35 subjects the reception signal to down-conversion from the carrier band to the baseband using envelope detection and synchronous detection.

The error-correcting decoder 36 subjects the reception bit stream supplied from the demodulator 35 to error-correction decoding processing for performing the decoding corresponding to the correction encoding performed at the error-correcting encoder 23 of the transmission device 11. The bit stream decoded with the error-correction decoding processing is supplied to the error-amplifying decoder 37 as an error-amplified reception bit stream.

The error-amplifying decoder 37 subjects the error-amplified reception bit stream supplied from the error-correcting decoder 36 to error-amplification decoding processing for performing the decoding corresponding to the error-amplifying encoding performed at the error-amplifying encoder 22 of the transmission device 11. The bit stream decoded with the error-amplification decoding processing is supplied to the decoder 38 as a reception information bit stream.

The decoder 38 subjects the reception information bit stream supplied from the error-amplifying decoder 37 to source decoding processing for performing the decoding corresponding to the encoding performed at the source encoder 21 of the transmission device 11. As a result thereof, the decoder 38 can obtain predetermined information output at the transmission device 11 as the transmission information, and outputs this to another device connected to a later stage.

Note that as described above, in the case of providing an encryptor or scrambler at the transmission device 11, there is provided an encrypted information decipherer for deciphering encrypted predetermined information, or a descrambler for subjecting encrypted predetermined information to inverse transformation of the scramble processing at the reception device 12, corresponding thereto.

The communication system 1 thus configured has features in that the error-amplifying encoder 22 is provided at the transmission device 11, and the error-amplifying decoder 37 corresponding thereto is provided at the reception device 12.

The transmission device 11 includes the error-amplifying encoder 22, whereby the error rate of the signal on the communication path 13 is increased to ½ due to the interference signal which the reception device 12 transmits onto the communication path 13, and the third party wiretapping the transmission signal transmitted by the transmission device 11 is prevented from restoring the transmission signal, but the reception device 12 has known the interference signal output by itself, so can restore the transmission signal by removing the interference signal from the reception signal.

Next, description will be made with reference to FIG. 2 regarding the relation between an error rate and a signal-to-noise ratio at which the communication system 1 aims. The horizontal axis in FIG. 2 represents the signal-to-noise ratio (hereafter, also referred to as SNR) [dB] of a reception signal, and the vertical axis represents an error rate (hereafter, also referred to as bER).

Now, let us say that bER capable of deciphering information sufficiently is $10^{-6}$, and bER incapable of deciphering information is $10^{-1}$. Also, bER of $10^{-1}$ or so is an extremely great error rate in the case of requiring the accuracy of information, but it cannot be said that this is not a sufficient error rate from the perspective of requiring the confidentiality of information, and accordingly, let us say that if bER is ½ (0.5) or so, it is impossible to decipher information.

Figure 2:
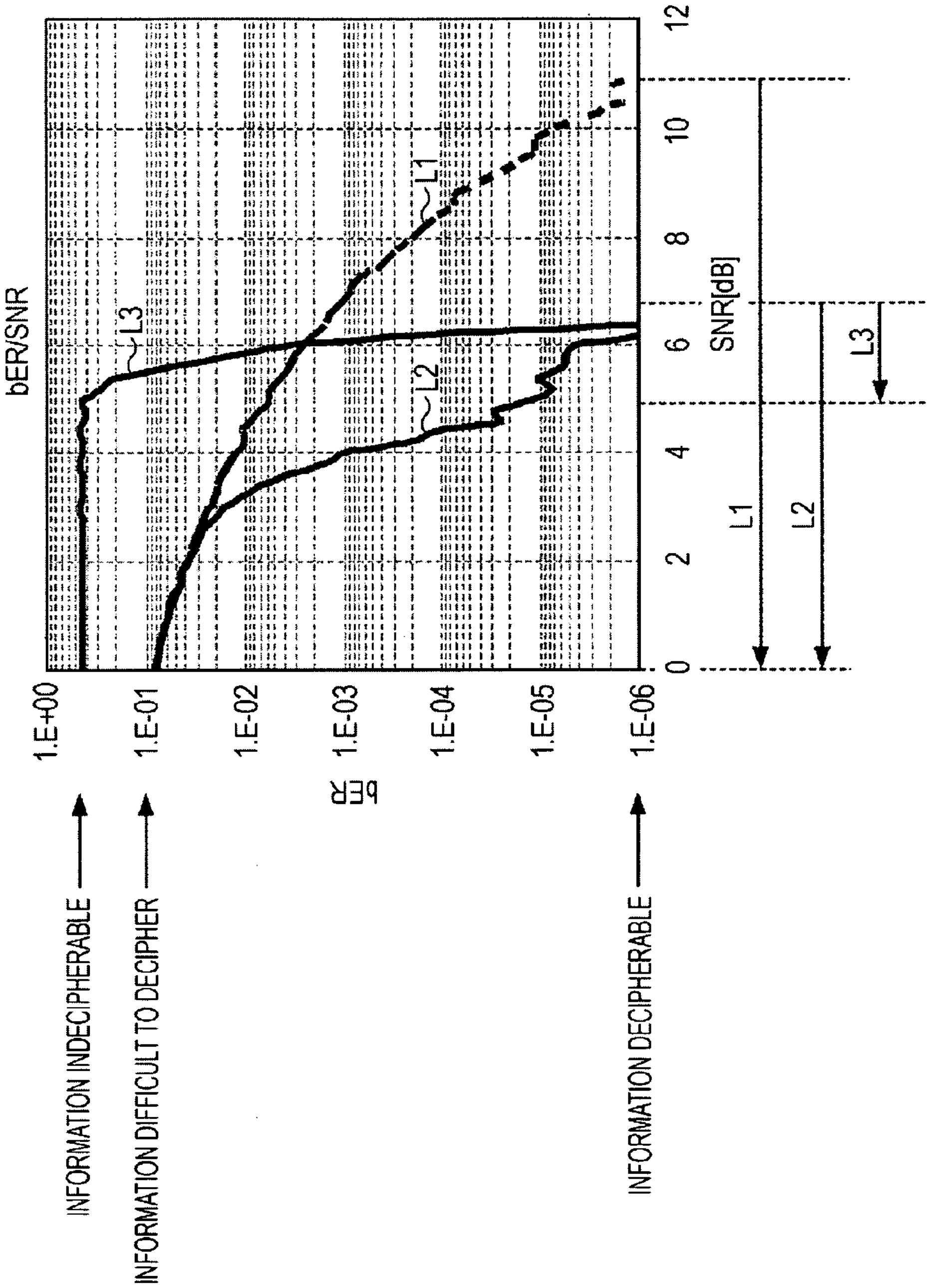
FIG. 2 is a diagram describing the relation between an error rate (bER) and a signal-to-noise ratio (SNR) at which the communication system aims.

The dotted line L1 and solid line L2 in FIG. 2 illustrate the relation between bER and SNR with a communication system which performs no error amplification using the above-mentioned error-amplifying encoder 22 and error-amplifying decoder 37. The dotted line L1 is the relation between bER and SNR in the case of the error-correction encoding processing being not performed, and the solid line L2 is the relation between bER and SNR in the case of the error-correction encoding processing being performed.

On the other hand, the solid line L3 in FIG. 2 illustrates the ideal relation between bER and SNR at which the communication system 1 aims, which includes the error-amplifying encoder 22 and error-amplifying decoder 37.

According to FIG. 2, in the case of performing neither the error-correction encoding nor the error amplification, SNR wherein bER becomes $10^{-6}$ is 11 [dB], and SNR wherein bER becomes $10^{-1}$ is 0 [dB], so the transmission device 11 transmits the transmission signal greater than 11 [dB] or more, and the reception device 12 transmits the interference signal onto the communication path 13, whereby if the reception signal is deteriorated until SNR becomes from 11 [dB] to 0 [dB], it becomes difficult to decipher the information. Conversely, in order to make it difficult to decipher the information, there is a need to output an interference signal having a predetermined size which causes the SNR of the transmission signal which is 11 [dB] to be 0 [dB]. Also, in order to increase bER to a level of ½ which makes it difficult to decipher the information, there is a need to output a further great interference signal.

Also, in the case of performing the error-correction encoding but not performing the error amplification, SNR wherein bER becomes $10^{-6}$ is 6.5 [dB], and SNR wherein bER becomes $10^{-}$ is 0 [dB], so the transmission device 11 transmits the transmission signal which is 6.5 [dB], and the reception device 12 transmits the interference signal onto the communication path 13, whereby if the reception signal is deteriorated until SNR becomes from 6.5 [dB] to 0 [dB], it becomes difficult to decipher the information. Conversely, in order to make it difficult to decipher the information, there is a need to output an interference signal having a predetermined size which causes the SNR of the transmission signal which is 6.5 [dB] to be 0 [dB]. Accordingly, performing the error-correction encoding enables the size of the interference signal to be reduced as compared with the case of not performing the error correction, but in order to increase bER to a level of ½ which makes it difficult to decipher the information, there is a need to output a further great interference signal.

On the other hand, the communication system 1 in FIG. 1 aims at a system wherein simply by superimposing a minute interference signal on the transmission signal of which the SNR is 6.5 [dB], bER is rapidly deteriorated, and also increases bER to a level of ½ which makes it difficult to decipher the information.

With the example of the solid line L3 shown in FIG. 2, simply by superimposing the interference signal such that the SNR of the transmission signal which is 6.5 [dB] becomes a level of 5 [dB], i.e., simply by the reception device 12 transmitting the interference signal equivalent to 1.5 [dB] worth, bER can be increased to a level of ½ which makes it difficult to decipher the information. Accordingly, according to the communication system 1, it can be conceived to perform confidentiality of information very efficiently.

Note that the data shown in FIG. 2 is an example employing AWGN as an interference signal, but it goes without saying that the same property as that in FIG. 2 is shown even in the case of other than AWGN.

Figure 3:
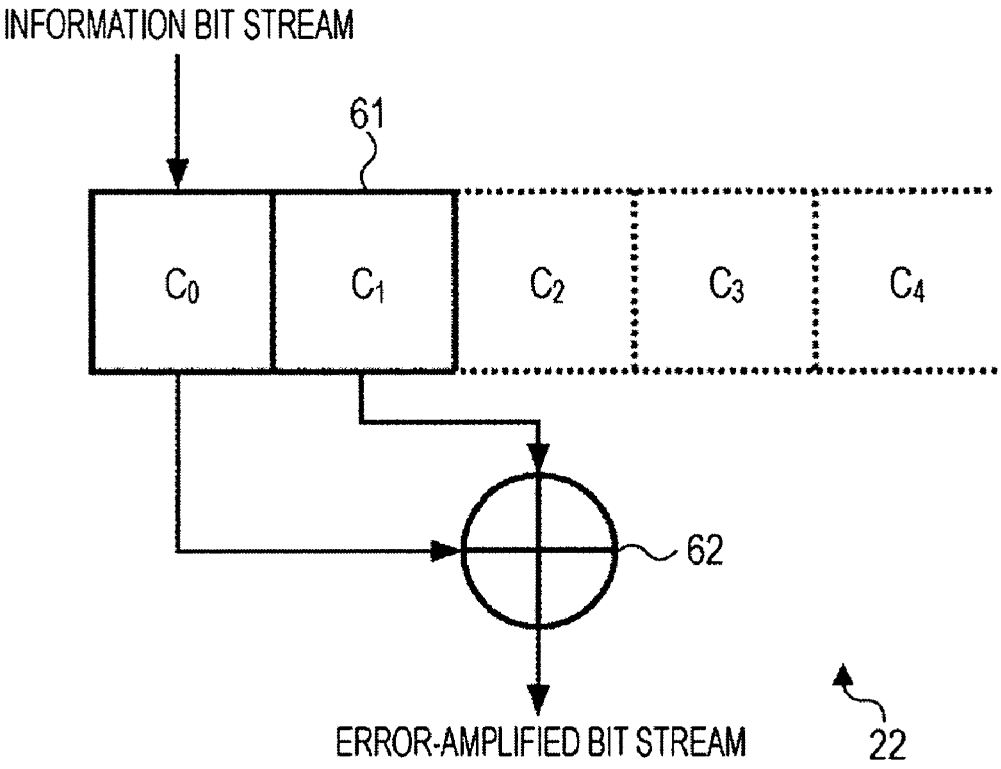
FIG. 3 is a block diagram illustrating a detailed configuration example of an error-amplifying encoder.

FIG. 3 is a block diagram illustrating a detailed configuration example of the error-amplifying encoder 22 of the transmission device 11.

The error-amplifying encoder 22 is configured of a shift register 61 and an exclusive OR gate 62. The error-amplifying encoder 22 performs, in the same way as with the error-correcting encoder 23 of a later stage, processing in increments of block with 4096 bits worth of an input information bit stream as one block.

With the shift register 61, of n bits (only five bits are shown in FIG. 3), only two bits worth is used. That is to say, the bit values of the information bit stream supplied from the source encoder 21 are input to a bit $C_0$ sequentially. Upon a new bit value being input to the bit $C_0$, the bit value which has been stored in the bit $C_0$ is shifted to a bit $C_1$. Also, upon a new bit value being input to the bit $C_0$, the bit value which has been stored in the bit $C_0$ and $C_1$ is output to the exclusive OR gate 62.

The exclusive OR gate 62 computes exclusive OR of the bit values of the two bits supplied from the shift register 61, and supplies the computation result thereof to the error-correcting encoder 23.

That is to say, if we say that the i'th bit value of the information bit stream supplied from the source encoder 21 is d(i) (=0 or 1), and the i'th bit value of the error-amplified bit stream to be output to the error-amplifying encoder 22 after the error-amplification encoding processing is t(i) (=0 or 1), the exclusive OR gate 62 computes t(i)=d(i)^(i−1). Here, "^" represents an exclusive OR operation (add operation with 2 as modulus).

Accordingly, it can be said that the error-amplifying encoder 22 is an encoder for computing exclusive OR of the consecutive two bits of the input information bit stream, and performing convolutional encoding wherein one bit is output as to input of one bit, i.e., an encoding rate is 1. Also, the error-amplifying encoder 22 is an encoder for performing inverse transformation of NRZI (Non Return to Zero Inversion) transformation.

The error-amplifying encoder 22 can employ the hardware configuration of a convolutional encoder. Also, the error-amplifying encoder 22 can also employ the hardware configuration of Reed Solomon code, BCH code, Hamming code, or the like. Note however, even in this case, it is desirable to prepare for a thinning device or the like to set the encoding rate to 1, and also as a bit to be thinned out, it is desirable to thin out the bit determined with a predetermined bit alone before being subjected to thinning out.

Figure 4:
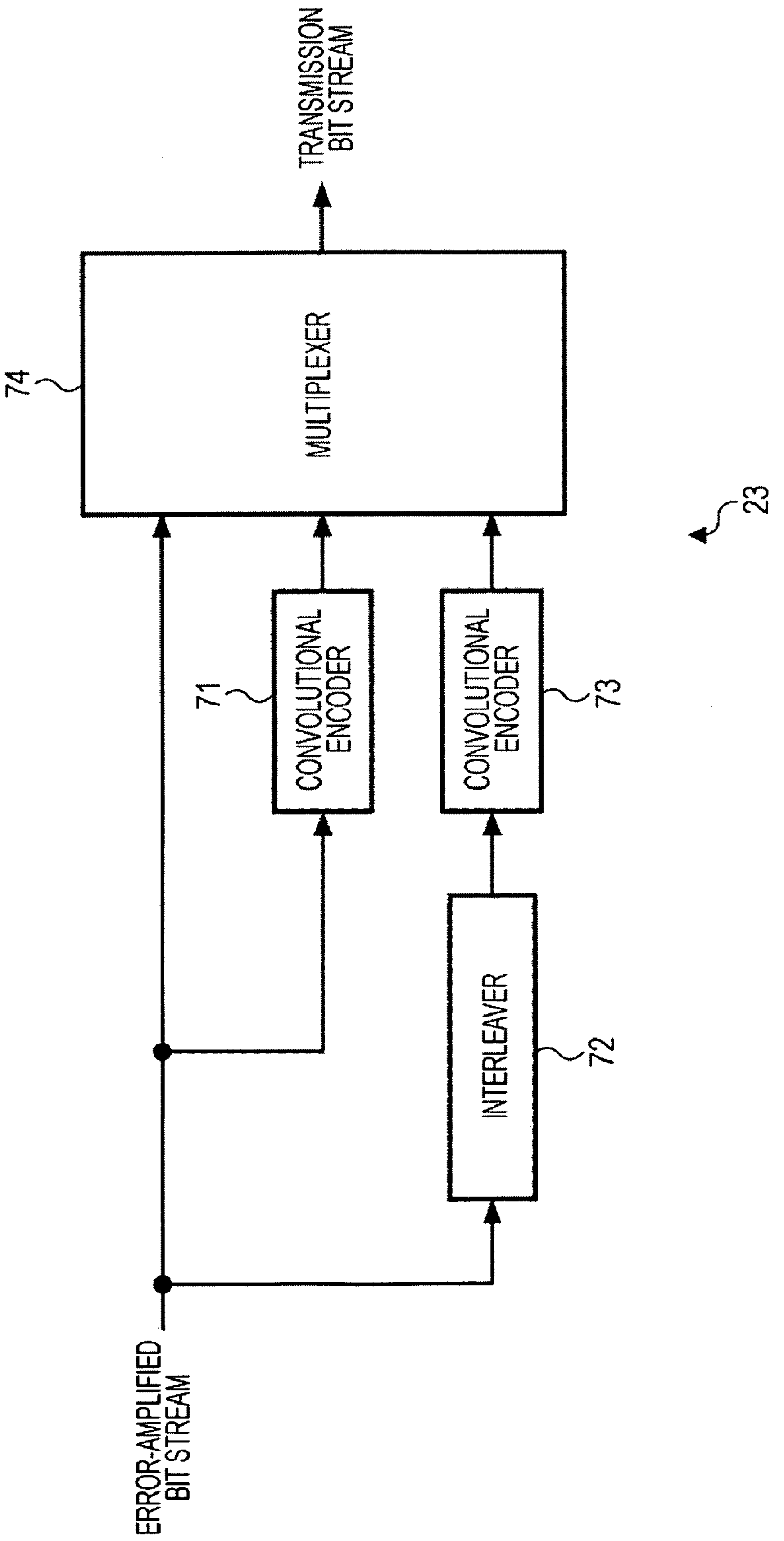
FIG. 4 is a block diagram illustrating a detailed configuration example of an error-correcting encoder.

FIG. 4 is a block diagram illustrating a detailed configuration example of the error-correcting encoder 23.

The error-correcting encoder 23 is an encoder for performing turbo convolutional coding, and is configured of a convolutional encoder 71, an interleaver 72, a convolutional encoder 73, and a multiplexer 74. The error-correcting encoder 23 processes an input error-amplified bit stream for each 4096 bits. Note that there is necessarily no need to perform the processing in increments of 4096 bits, but it is desirable to perform the processing for each block in increments of a predetermined number of bits, and it is desirable to coincide this number of bits with that of the error-amplifying encoder 22.

Accordingly, the error-amplified bit stream of 4096 bits is supplied to the convolutional encoder 71, interleaver 72, and multiplexer 74.

The convolutional encoder 71 creates a first parity bit stream from the supplied error-amplified bit stream, and supplies this to the multiplexer 74. The interleaver 72 rearranges the order of the bit values of the error-amplified bit stream at random, and supplies this to the convolutional encoder 73. The convolutional encoder 73 creates a second parity bit stream from the error-amplified bit stream rearranged at random, and supplies this to the multiplexer 74.

The multiplexer 74 selects, of the error-amplified bit stream, first parity bit stream, and second parity bit stream, a predetermined bit value in accordance with a predetermined selection rule determined depending on the encoding rate beforehand, and outputs this. For example, in the case of outputting a bit value in accordance with a selection rule wherein the error-amplified bit stream is output as is, and the bit values from the convolutional encoders 71 and 73 are output at the rate of n bits at a time, error-correction encoding can be performed at an encoding rate of N/(N+2).

The error-correcting encoder 23 shown in FIG. 4 can be configured of hardware made up of a shift register of three bits of bits $C_0$ through $C_2$, and two exclusive OR gates disposed in the previous stage and later stage of the shift register.

The exclusive OR gate at the previous stage of the shift register computes exclusive OR with three bits of the bit value of the input error-amplified bit stream and the bit values stored in the bits $C_1$ and $C_2$ as input, and outputs the result thereof to the bit $C_0$. Upon a new bit value being input, the bit values which have been stored in the bits $C_0$ and $C_1$ are shifted to the bits $C_1$ and $C_2$. The exclusive OR gate at the later stage of the shift register computes exclusive OR with two bits of the bit value stored in the bit $C_0$ and the bit value stored in the bits $C_2$ as input, and outputs the result thereof.

Accordingly, the error-amplifying encoder 22 and error-correcting encoder 23 can be configured by preparing for two pieces of hardware made up of the same convolutional encoder, and changing the connection thereof, so the transmission device 11 can be realized with a simple hardware configuration.

Note that with the error-correcting encoder 23, in the same way as with the error-amplifying encoder 22, another error-correction encoding for performing hard determination output may be employed, such as Reed Solomon code, BCH code, Hamming code, or the like.

Figure 5:
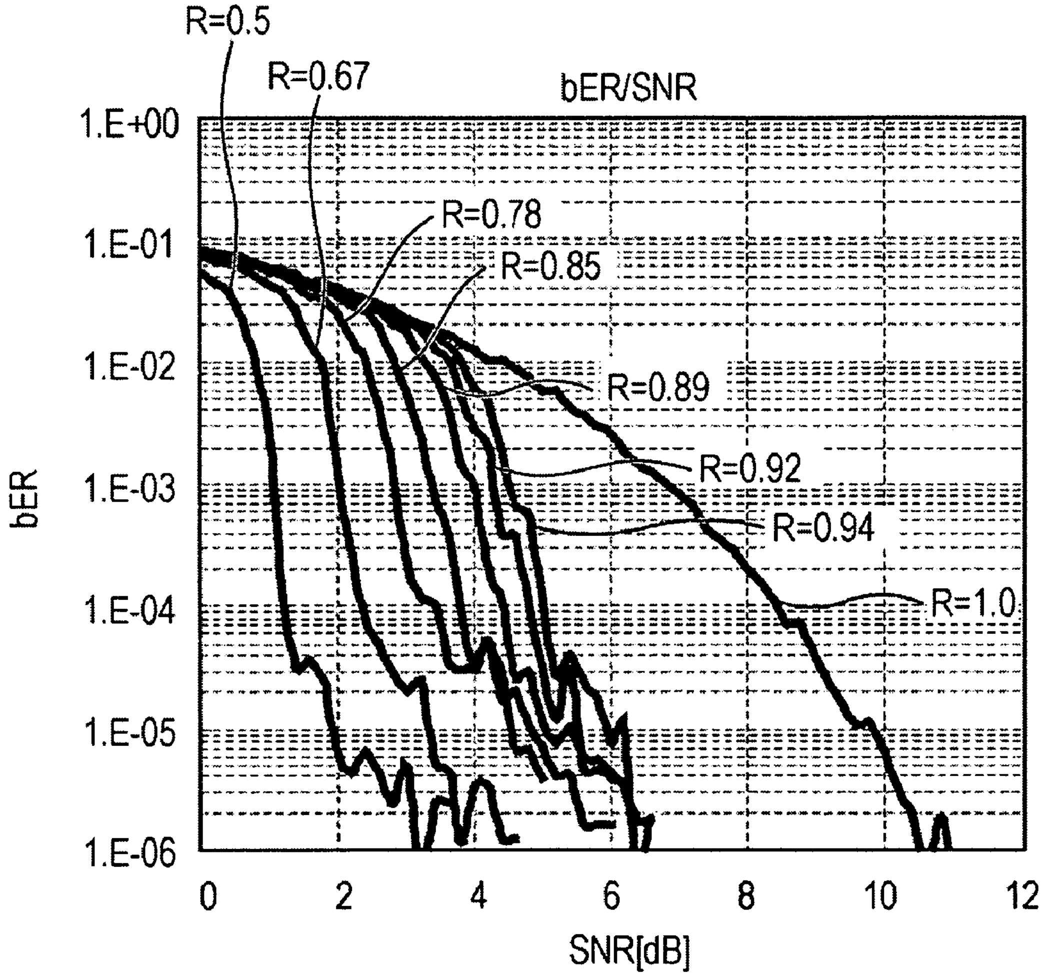
FIG. 5 is a diagram illustrating the relation between an error rate (bER) and a signal-to-noise ratio (SNR) with turbo convolutional encoding.

Note however, the turbo convolutional code employed as the error-correcting encoder 23, and turbo product code, and LDPC code are desirable as compared with other error-correction encoding such as Reed Solomon code, BCH code, Hamming code, or the like, in that as shown in FIG. 5, there is a marked tendency in that the error rate is very small in the case of a signal-to-noise ratio being greater than a predetermined value, but upon a signal-to-noise ratio becoming smaller than a predetermined value, the error rate rapidly comes close to the error rate in the case of being subjected to no encoding.

FIG. 5 is a diagram illustrating the relation between an error rate and a signal-to-noise ratio with the turbo convolutional code. In FIG. 5, the horizontal axis represents SNR [dB], and the vertical axis represents bER.

The nine solid lines in FIG. 5 illustrate the relation between bER and SNR when changing an encoding rate R to 0.5, 0.67, 0.78, 0.85, 0.89, 0.92, 0.94, and 1.0 (R=0.5, 0.67, 0.78, 0.85, 0.89, 0.92, 0.94, 1.0).

In order to change the encoding rate R to 0.5, 0.67, 0.78, 0.85, 0.89, 0.92, and 0.94, this can be realized by the multiplexer 74 selecting all of the error-amplified bit stream, and changing the timing of selecting the bit values from the convolutional encoders 71 and 73 to two bits at a time, four bits at a time, seven bits at a time, 11 bits at a time, 16 bits at a time, 22 bits at a time, and 29 bits at a time, in order.

According to FIG. 5, in the case of being subjected to the turbo convolutional encoding, and the encoding rate R being changed to 0.5, 0.67, 0.78, 0.85, 0.89, 0.92, and 0.94, the level of deterioration of bER when SNR is decreased is greater than that in the case of being subjected to no turbo convolutional encoding (in the case of R=1.0), and with SNR being at or below a predetermined value, bER is almost the same as that in the case of being subjected to no turbo convolutional encoding (in the case of R=1.0).

Accordingly, it can be said that the turbo convolutional encoding is an encoding wherein in the case of a signal-to-noise ratio being greater than a predetermined value, the error rate is very small (bER is at or below $10^{-6}$), but upon a signal-to-noise ratio becoming at or below a predetermined value, change in the error rate as to deterioration of a signal-to-noise ratio is greater than that in the case of being subjected to no encoding, and the error rate rapidly approximates the error rate in the case of being subjected to no encoding, in accordance with deterioration of a signal-to-noise ratio.

Figure 6:
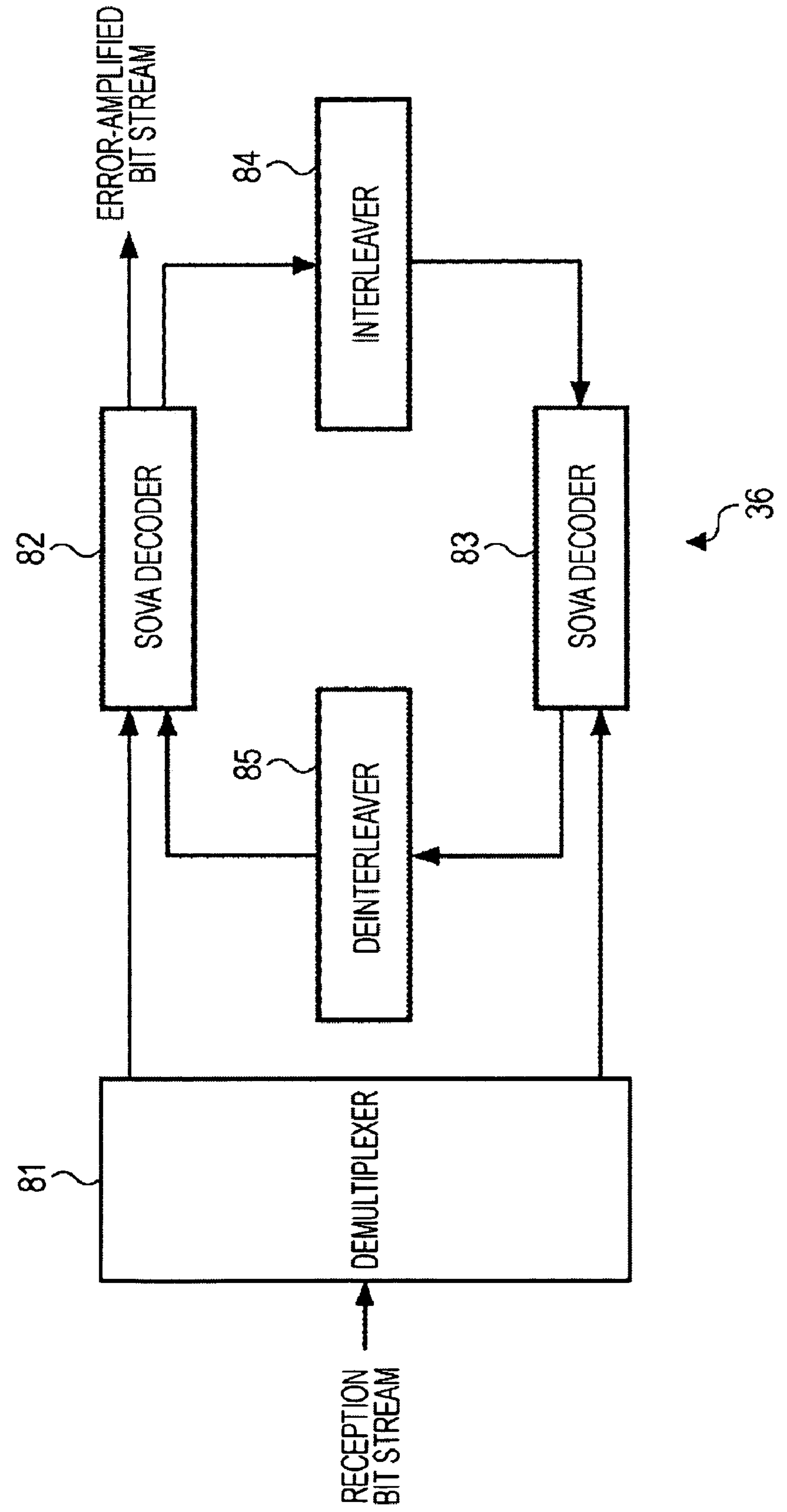
FIG. 6 is a block diagram illustrating a detailed configuration example of an error-correcting decoder.

FIG. 6 is a block diagram illustrating a detailed configuration example of the error-correcting decoder 36 of the reception device 12, which is the decoder corresponding to the error-correcting encoder 23 shown in FIG. 4.

The error-correcting decoder 36 is configured of a demultiplexer 81, SOVA (Soft Output Viterbi algorithm) decoders 82 and 83, an interleaver 84, and a deinterleaver 85.

The demultiplexer 81 separates the reception bit stream supplied from the demodulator 35 into a first reception stream corresponding to the error-amplified bit stream input to the multiplexer 74 of the error-correcting encoder 23, and second and third reception streams corresponding to the first and second parity bit streams. Subsequently, the demultiplexer 81 supplies the first and second reception streams to the SOVA decoder 82, and also supplies the third reception stream to the SOVA decoder 83.

The SOVA decoder 82 subjects the input first and second reception streams to forward/backward probability decoding processing, and outputs first and second hard determination viterbi output streams corresponding to the input first and second reception streams to the interleaver 84.

The interleaver 84 rearranges the first and second hard determination viterbi output streams at random, and outputs these to the SOVA decoder 83. The SOVA decoder 83 subjects the first and second hard determination viterbi output streams rearranged at random, and third reception stream to feedforward probability decoding processing, and outputs the first and third hard determination viterbi output streams corresponding to the first and third reception streams to the deinterleaver 85. The deinterleaver 85 performs the inverse transformation of rearrangement of the interleaver 84, and outputs the result thereof to the SOVA decoder 82.

Following circulation processing in order of the SOVA decoder 82, interleaver 84, SOVA decoder 83, and deinterleaver 85 being repeated several times to several tens of times, bit determination is made by an unshown bit detector, and the error-amplified reception bit stream is output from the SOVA decoder 82.

Figure 7:
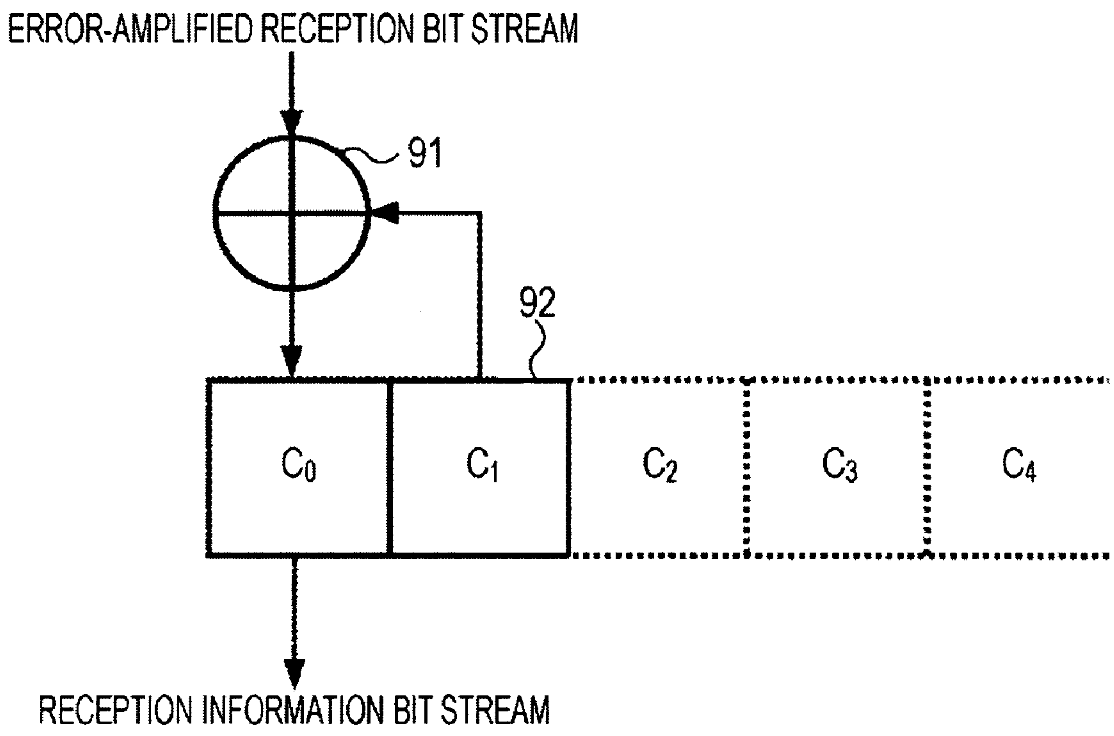
FIG. 7 is a block diagram illustrating a detailed configuration example of an error-amplifying decoder.

FIG. 7 is a block diagram illustrating a detailed configuration example of the error-amplifying decoder 37 of the reception device 12.

The error-amplifying decoder 37 is configured of an exclusive OR gate 91, and a shift register 92.

The exclusive OR gate 91 computes exclusive OR using input of two bits of the bit value of the error-amplified reception bit stream supplied from the error-correcting decoder 36, and the bit value stored in the bit $C_1$ of the shift register 92, and supplies the computation result to the bit $C_0$ of the shift register 92.

With the shift register 92, of n bits (only five bits are shown in FIG. 7), only two bits worth is used. The computation result of the exclusive OR supplied from the exclusive OR gate 91 is sequentially input to the bit $C_0$. Upon a new bit value being input to the bit $C_0$, the bit value which has been stored in the bit $C_0$ is shifted to the bit $C_1$. Also, upon a new bit value being input to the bit $C_0$, the bit value which has been stored in the bit $C_0$ is output to the decoder 38.

That is to say, if we say that the i'th bit value of the error-amplified reception bit stream input from the error-correcting decoder 36 is r(i) (=0 or 1), and the i'th bit value of the reception information bit stream to be output to the decoder 38 after the error-amplification decoding processing is s(i) (=0 or 1), the exclusive OR gate 91 computes s(i)=r(i)^s(i−1). Here, "^" represents an exclusive OR operation (add operation with 2 as modulus).

Accordingly, the error-amplifying decoder 37 performs the inverse transformation of the error-amplifying encoder 22, which is equivalent to NRZI transformation.

Next, description will be made regarding the operation and advantage of the error-amplifying encoder 22 and error-amplifying decoder 37 with reference to FIG. 8.

For example, with the transmission device 11, when the bit values d(2) through d(10) of the information bit stream before the error-amplification encoding processing supplied from the source encoder 21 are "001111000" the error-amplifying encoder 22 encodes those to "01000100" using the error-amplification encoding processing, and outputs these as the bit values t(3) through t(10) of an error-amplified bit stream.

Subsequently, when the reception device 12 receives the bit values t(3) through t(10) of the error-amplified bit stream, i.e., when the bit values r(3) through r(10) of the error-amplified reception bit stream input to the error-amplifying decoder 37 are the same "101000100" as the bit values t(3) through t(10) of the error-amplified bit stream, the bit values s(2) through s(10) of the reception information bit stream after the error-amplification decoding processing become "001111000".

Accordingly, in the case of the error-amplified bit stream received by the reception device 12 having no error, the error-amplified bit stream transmitted by the transmission device 11 is identical to the error-amplified bit stream received by the reception device 12, and correct decoding is realized. Now, let us say that as the bit value s(2) "0" is obtained from the previous bit values r(2) and s(1) thereof.

On the other hand, for example, in the case of errors occurring at the bit values r(4) and r(8) of the error-amplified reception bit stream which are surrounded with a circle, i.e., in the case of the error-amplifying decoder 37 receiving the bit values r(3) through r(10) of the error-amplified reception bit stream as "00000000", the bit values s(2) through s(10) of the reception information bit stream after the error-amplification decoding processing becomes "000000000".

Upon comparing "001111000" which are the bit values s(2) through s(10) in the case of including no error with "000000000" which are the bit values s(2) through s(10) in the case of including errors, the bit values s(4) through s(7) which are surrounded with a dotted line in the drawing are not decoded to the original right bit values. That is to say, from the bit value s(4) corresponding to the bit value r(4) where an error occurs to the bit value s(7) corresponding to the bit value r(7) before the bit value where the next error occurs are not decoded to the original right bit values.

Thus, the error-amplification encoding processing by the error-amplifying encoder 22 of the transmission device 11 includes a function wherein in the case of an error occurring at the reception bit stream of the reception side, the bit values are inverted until the next error occurs, and thus, the error rate thereof is amplified.

Figure 9:
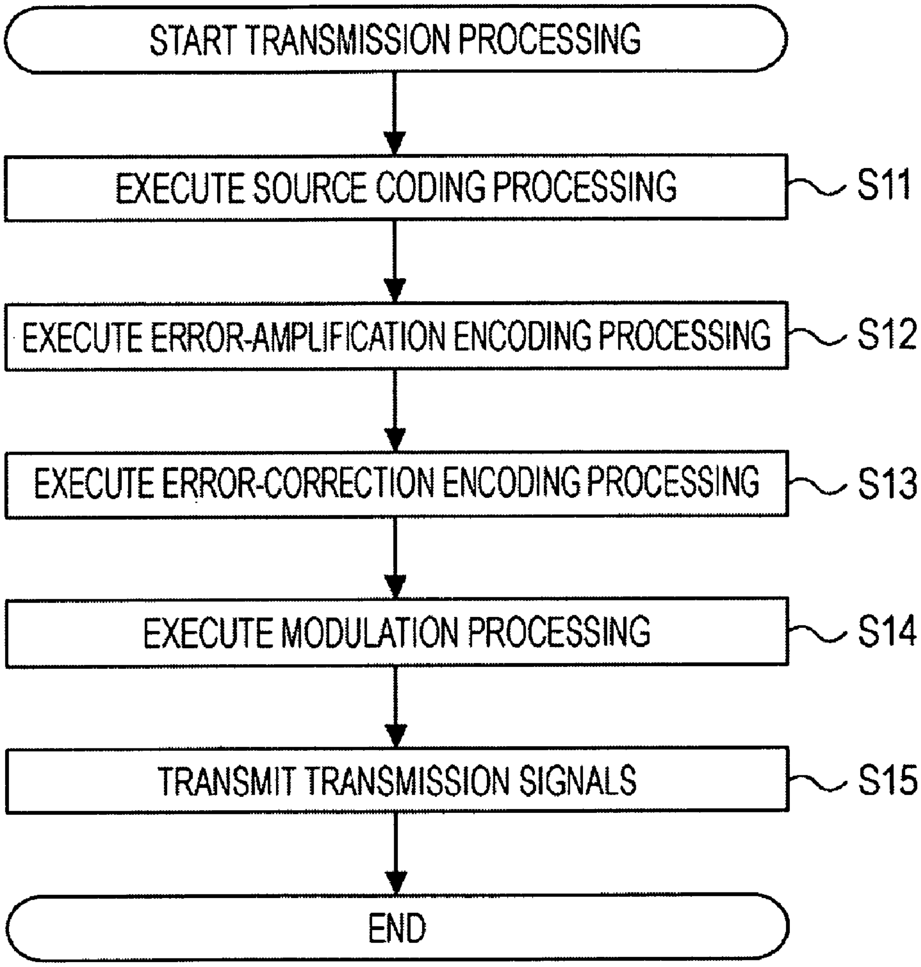
FIG. 9 is a flowchart describing transmission processing by a transmission device.

Next, description will be made regarding the transmission processing by the transmission device 11 with reference to the flowchart in FIG. 9. This processing is started when transmission information is supplied to the source encoder 21.

First, in step S11, the source encoder 21 executes the source encoding processing for encoding transmission information using a predetermined encoding system. With the source encoding processing, the transmission information is converted into an information bit stream, and supplied to the error-amplifying encoder 22.

In step S12, the error-amplifying encoder 22 subjects the information bit stream supplied from the source encoder 21 to the error-amplification encoding processing. The bit stream subjected to the error-amplification encoding processing is supplied to the error-correcting encoder 23 as an error-amplified bit stream.

In step S13, the error-correcting encoder 23 subjects the error-amplified bit stream to the error-correction encoding processing. As for the error-correcting encoding system, as described above, the turbo convolutional code is employed, and the transmission bit stream after the error-correction processing is supplied to the modulator 24.

In step S14, the modulator 24 modulates the transmission bit stream using a predetermined modulation system, supplies the transmission signal obtained as the modulation result to the transmission antenna 25, the transmission antenna 25 transmits the transmission signal, and the processing ends.

Figure 10:
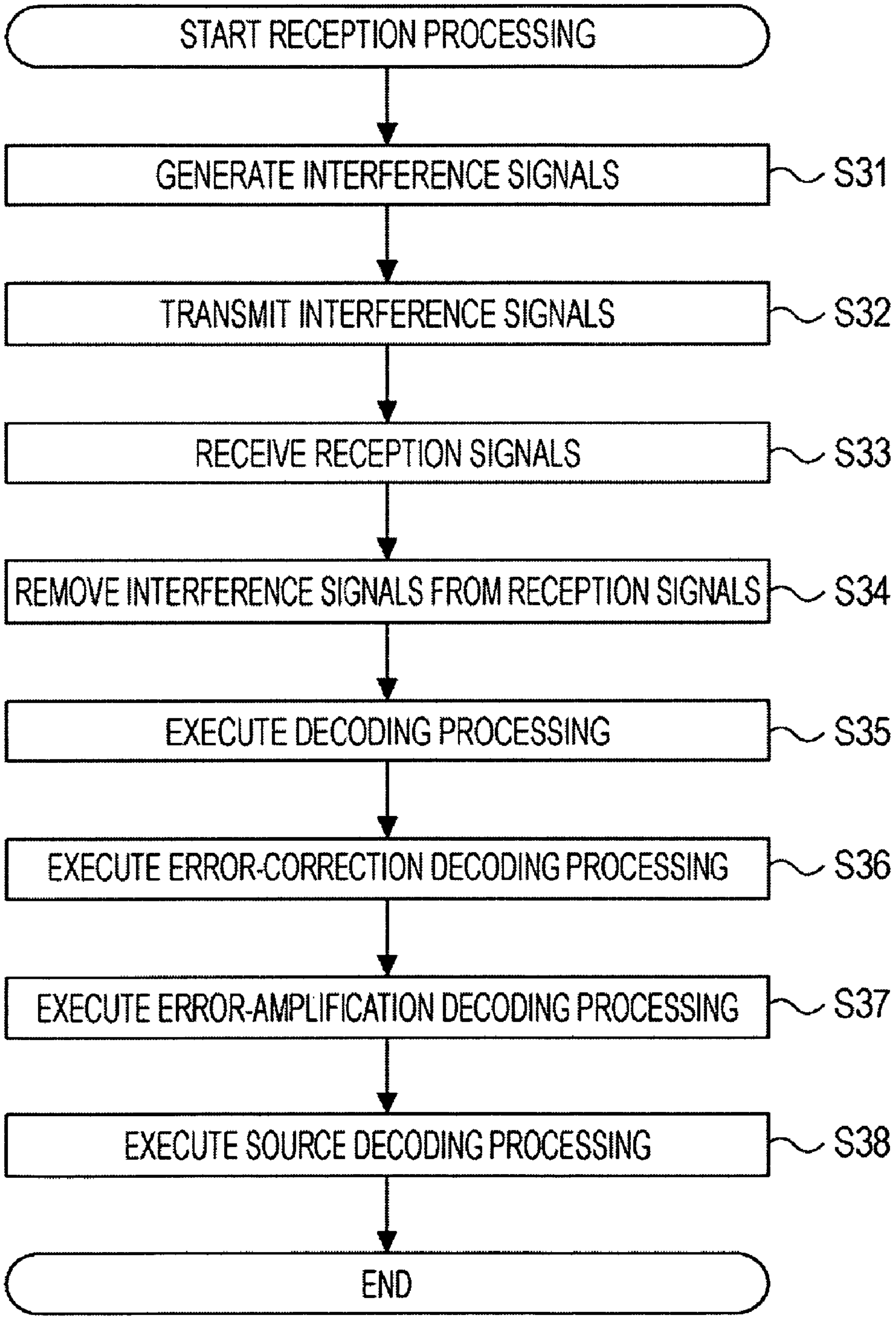
FIG. 10 is a flowchart describing reception processing by a reception device.

Next, description will be made regarding the reception processing by the reception device 12 with reference to the flowchart in FIG. 10. This processing is started at the timing wherein a transmission signal is transmitted from the transmission device 11.

First, in step S31, the interference signal generator 31 generates an interference signal. As for an interference signal, for example, a signal using a bit stream of AWGN or pseudo-random number can be employed.

In step S32, the transmission antenna 32 transmits the interference signal supplied from the interference signal generator 31 onto the communication path 13.

In step S33, the reception antenna 33 receives the reception signal including the transmission signal from the transmission device 11, and the interference signal generated by itself, and supplies this to the subtractor 34.

In step S34, the subtractor 34 removes the interference signal from the reception signal supplied from the reception antenna 33, and supplies the signal after removal to the demodulator 35.

In step S35, the demodulator 35 subjects the signal supplied from the subtractor 34 to demodulation processing, and supplies the reception bit stream after the processing to the error-correcting decoder 36. As for the demodulation system employed here, a system corresponding to the modulation system performed at the modulator 24 of the transmission device 11 is employed.

In step S36, the error-correcting decoder 36 subjects the reception bit stream supplied from the demodulator 35 to the error-correction decoding processing using a decoding system corresponding to the correction encoding at the error-correcting encoder 23 of the transmission device 11. The bit stream decoded by the error-correction decoding processing is supplied to the error-amplifying decoder 37 as an error-amplified reception bit stream.

In step S37, the error-amplifying decoder 37 subjects the error-amplified reception bit stream supplied from the error-correcting decoder 36 to the error-amplification decoding processing using a decoding system corresponding to the error-amplifying encoding performed at the error-amplifying encoder 22 of the transmission device 11. The bit stream decoded by the error-amplification decoding processing is supplied to the decoder 38 as a reception information bit stream.

The decoder 38 subjects the reception information bit stream supplied from the error-amplifying decoder 37 to the source decoding processing using a decoding system corresponding to the encoding performed at the source encoder 21 of the transmission device 11. The reception information obtained by the source decoding processing is output to another device connected to a later stage, and the reception processing ends.

Figure 11:
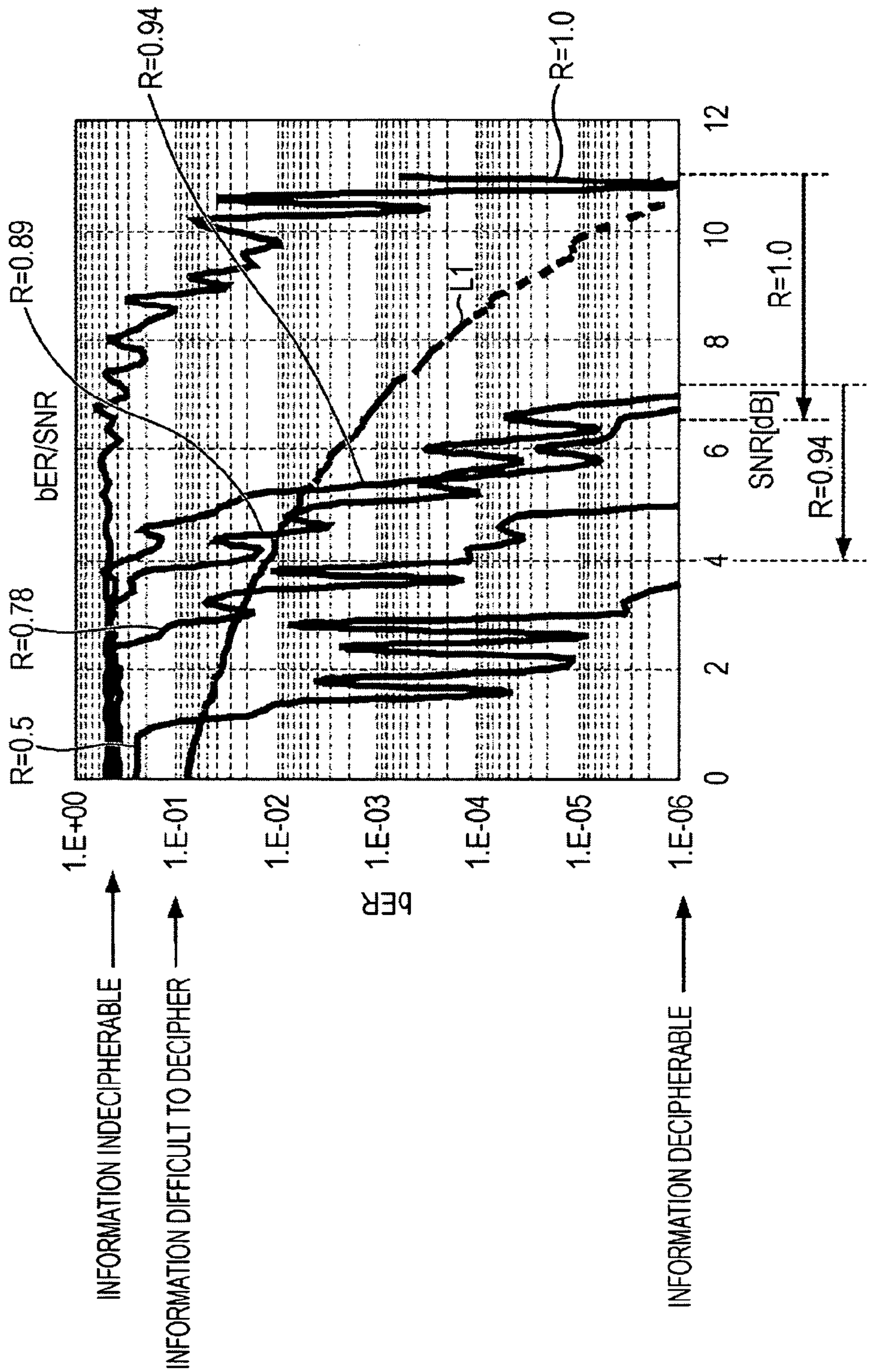
FIG. 11 is a diagram illustrating the relation between an error rate (bER) and a signal-to-noise ratio (SNR) with an embodiment of the communication system to which the present invention is applied.

FIG. 11 illustrates the relation between an error rate and a signal-to-noise ratio which were actually measured at the communication system 1. The horizontal axis and vertical axis in FIG. 11 represent, in the same way as with FIG. 2, SNR [dB] and bER.

The five solid lines in FIG. 11 illustrate the relation between bER and SNR when changing the encoding rate R to 0.5, 0.78, 0.89, 0.94, and 1.0 (R=0.5, 0.78, 0.89, 0.94, 1.0). The dotted line L1 in FIG. 11 is the same as the dotted line L1 in FIG. 2.

According to the relation between bER and SNR shown in FIG. 11, it can be found that even at any encoding rate R, in the same way as with the solid line L3 which is the target relation between bER and SNR in FIG. 2, bER is rapidly increased due to a little deterioration of SNR from SNR with information decipherable, and at a predetermined SNR value greater than 0 [dB] bER becomes ½ which makes it difficult to decipher information.

For example, in the case of the encoding rate R being set to 1.0 with the communication system 1, simply by deteriorating the transmission signal of SNR of 11 [dB] to SNR of 6.5 [dB], bER can be set to a level of ½ which makes it impossible to decipher information, which exceeds a level of $10^{-1}$ which makes it difficult to decipher information.

As described above, according to the communication system 1, the error-amplification encoding processing and error-correction encoding processing are executed at the transmission device 11, whereby encoding can be realized wherein the error rate in the case of a signal-to-noise ratio (SNR) being greater than a first signal-to-noise ratio is at or below a predetermined value which makes it possible to decipher information, and the error rate in the case of a signal-to-noise ratio being smaller than a second signal-to-noise ratio is 1/2 which makes it impossible to decipher information.

According to an example in the case of the encoding rate R in FIG. 11 being set to 1.0, encoding can be realized wherein the error rate in the case of a signal-to-noise ratio (SNR) being greater than 11 [dB] is at or below $10^{-6}$ which makes it possible to decipher information, and the error rate in the case of a signal-to-noise ratio being smaller than 6.5 [dB] is 1/2 which makes it impossible to decipher information. In other words, encoding is realized wherein a minute interference signal equivalent to 4.5 [dB] is included in a reception signal, whereby the error rate becomes ½ which makes it impossible to decipher information, whereby wiretapping by the third party can be prevented.

According to an example in the case of the encoding rate R being set to 0.94, the error rate in the case of a signal-to-noise ratio (SNR) being greater than 7 [dB] becomes at or below $10^{-6}$ which makes it possible to decipher information, and the error rate in the case of a signal-to-noise ratio being smaller than 4 [dB] becomes 1/2 which makes it impossible to decipher information.

With the communication system 1, in order to subject information to confidentiality between the transmission device 11 and reception device 12, first, the encoding rate R or the signal-to-noise ratio (SNR) of a transmission signal is determined.

Specifically, in the case of the encoding rate R being determined to be 0.94, the size of a transmission signal is adjusted such that the signal-to-noise ratio of the transmission signal transmitted from the transmission antenna 25 becomes 7 [dB]. Conversely, in the case of taking a state in which the signal-to-noise ratio of the transmission signal transmitted from the transmission antenna 25 is 7 [dB] as reference, the size of a transmission signal is adjusted such that the encoding rate R becomes 0.94. Subsequently, upon the reception device 12 transmitting an interference signal equivalent to 3 [dB] worth, the signal-to-noise ratio of the signal flowing above the communication path 13 becomes 4 [dB], and the error rate becomes ½, whereby wiretapping by the third party can be prevented.

Note that with the communication system 1 in FIG. 1, an arrangement has been made wherein while the transmission device 11 is transmitting a transmission signal, the reception device 12 transmits an interference signal onto the communication path 13, but the transmission device 11 may transmit an interference signal instead of the reception device 12. Note however, in this case, the reception device 12 needs to have known the information of the interference signal which the transmission device 11 outputs.

Also, according to the error-amplification encoding processing at the error-amplifying encoder 22, as described with reference to FIG. 8, until the next error occurs after an error occurs, the error is amplified (bit values are inverted), so there is a tendency wherein errors occur in a block, such as a section where errors occur, and a section where no error occurs. Accordingly, it cannot be said that there is no turning this to the third party's own advantage and restoring an error to its original state. As countermeasure to this, an arrangement can be made wherein an interleaver for changing the array order of a bit stream is disposed at the transmission device 11 side, and corresponding thereto a deinterleaver for restoring the array order to the original state is provided at the reception device 12 side, whereby error positions are spread.

With the present Specification, the steps described in the flowcharts include not only processing performed in a time-oriented manner in accordance with the described order but also processing performed in parallel or individually even if the processing thereof is not necessarily performed in a time-oriented manner.

Also, with the present Specification, the term "system" represents the whole devices made up of multiple devices.

The embodiments of the present invention are not restricted to the above-mentioned embodiments, and various modifications can be made without departing from the essence of the present invention. It should be understood by those skilled in the art that various modifications, combinations, sub-combinations and alterations may occur depending on design requirements and other factors insofar as they are within the scope of the appended claims or the equivalents thereof.

What is claimed is:

1. A communication system comprising:

a transmission device configured to transmit predetermined information; and a reception device configured to receive said predetermined information;

wherein said transmission device includes encoding means configured to encode said predetermined information to obtain encoded information having following characteristics:

if, during transmission of said encoded information, a signal-to-noise ratio is greater than a first predetermined signal-to-noise ratio, an error rate of said encoded information is at or below a predetermined value, and if, during transmission of said encoded information, said signal-to-noise ratio is smaller than a second predetermined signal-to-noise ratio, said error rate of said encoded information becomes a value of one half (½), wherein said error rate is a ratio of the number of erroneous units of data to the total number of units of data transmitted, and wherein said second predetermined signal-to-noise ratio is smaller than said first predetermined signal-to-noise ratio; and wherein said reception device includes interference signal generating means configured to generate an interference signal to be superimposed on said encoded information being transmitted, said interference signal reducing said signal-to-noise ratio to be smaller than said second predetermined signal-to-noise ratio to cause said error rate of said encoded information to become a value of one half (½); and decoding means configured to decode said encoded information to obtain said predetermined information.

2. A transmission device comprising:

encoding means configured to encode transmission information to obtain encoded information having following characteristics:

if, during transmission of said encoded information, a signal-to-noise ratio is greater than a first predetermined signal-to-noise ratio, an error rate of said encoded information is at or below a predetermined value, and if, during transmission of said encoded information, said signal-to-noise ratio is smaller than a second predetermined signal-to-noise ratio, said error rate of said encoded information becomes a value of one half (½), wherein said error rate is a ratio of the number of erroneous units of data to the total number of units of data transmitted, wherein said second predetermined signal-to-noise ratio is smaller than said first predetermined signal-to-noise ratio, and wherein said encoded information is to be superimposed with an interference signal to reduce said signal-to-noise ratio to be smaller than said second predetermined signal-to-noise ratio to cause said error rate of said encoded information to become a value of one half (½).

3. The transmission device according to claim 2, said encoding means comprising:

error-amplifying encoding means configured to perform amplification encoding for amplifying said error rate to said value of one half (½); and error-correcting encoding means configured to perform error encoding whereby said error rate, in the case of a signal-to-noise ratio being greater than said first predetermined signal-to-noise ratio, is at or below said predetermined value, and change in an error rate as to deterioration of a signal-to-noise ratio, in the case of a signal-to-noise ratio being at or below said first predetermined signal-to-noise ratio, is greater than that in the case of performing no encoding, and the error rate thereof approximates the error rate in the case of performing no encoding in accordance with the deterioration of a signal-to-noise ratio.

4. The transmission device according to claim 3, wherein said error-amplifying encoding means performs amplification encoding in increments of block with a predetermined number of bits as a block.

5. The transmission device according to claim 3, wherein said error-amplifying encoding means determines the bits of the number of bits equivalent to an encoding rate of the number of all the bits encoded based on a combination of a bit value which is at or above two (2) of said transmission information.

6. The transmission device according to claim 5, wherein said encoding rate is one (1).

7. The transmission device according to claim 5, wherein said error-amplifying encoding means performs said amplification encoding by subjecting input of said one bit to convolutional encoding for outputting one bit.

8. The transmission device according to claim 5, wherein said error-amplifying encoding means performs said amplification encoding by outputting the exclusive OR of two bits input in a time-oriented manner.

9. The transmission device according to claim 3, further comprising:

rearranging means configured to rearrange the bit stream obtained by said encoding means encoding said information.

10. The transmission device according to claim 3, wherein said error-correcting encoding means performs correction encoding of which the encoding rate is smaller than one (1).

11. The transmission device according to claim 3, wherein said error-correcting encoding means performs correction encoding using an encoding system of a turbo code or LDPC code.

12. A transmission method comprising the step of:

encoding transmission information to obtain encoded information having following characteristics:

if, during transmission of said encoded information, a signal-to-noise ratio is greater than a first predetermined signal-to-noise ratio, an error rate of said encoded information is at or below a predetermined value, and if, during transmission of said encoded information, said signal-to-noise ratio is smaller than a second predetermined signal-to-noise ratio, said error rate of said encoded information becomes a value of one half (½); and generating an interference signal to be superimposed on said encoded information to reduce said signal-to-noise ratio to be smaller than said second predetermined signal-to-noise ratio to cause said error rate of said encoded information to become a value of one half (½), wherein said error rate is a ratio of the number of erroneous units of data to the total number of units of data transmitted, and wherein said second predetermined signal-to-noise ratio is smaller than said first predetermined signal-to-noise ratio.

13. A reception device comprising:

decoding means configured to decode encoded information having following characteristics:

if, during transmission of said encoded information, a signal-to-noise ratio is greater than a first predetermined signal-to-noise ratio, an error rate of said encoded information is at or below a predetermined value, and if, during transmission of said encoded information, said signal-to-noise ratio is smaller than a second predetermined signal-to-noise ratio, said error rate becomes a value of one half (½); and interference signal generating means configured to generate an interference signal to be superimposed on said encoded information being transmitted, said interference signal reducing said signal-to-noise ratio to be smaller than said second predetermined signal-to-noise ratio to cause said error rate of said encoded information to become a value of one half (½), wherein said error rate is a ratio of the number of erroneous units of data to the total number of units of data transmitted, and wherein said second predetermined signal-to-noise ratio is smaller than said first predetermined signal-to-noise ratio.

14. A communication system comprising:

a transmission device configured to transmit predetermined information; and a reception device configured to receive said predetermined information;

wherein said transmission device includes an encoding unit configured to encode said predetermined information to obtain encoded information having following characteristics:

if, during transmission of said encoded information, a signal-to-noise ratio is greater than a first predetermined signal-to-noise ratio, an error rate of said encoded information is at or below a predetermined value, and if, during transmission of said encoded information, said signal-to-noise ratio is smaller than a second predetermined signal-to-noise ratio, said error rate of said encoded information becomes a value of one half (½), wherein said error rate is a ratio of the number of erroneous units of data to the total number of units of data transmitted, and wherein said second predetermined signal-to-noise ratio is smaller than said first predetermined signal-to-noise ratio;

and wherein said reception device includes an interference signal generating unit configured to generate an interference signal to be superimposed on said encoded information being transmitted, said interference signal reducing said signal-to-noise ratio to be smaller than said second predetermined signal-to-noise ratio to cause said error rate of said encoded information to become a value of one half (½); and a decoding unit configured to decode said predetermined information subjected to encoding by said encoding unit.

15. A transmission device comprising:

an encoding unit configured to encode transmission information to obtain encoded information having following characteristics:

if, during transmission of said encoded information, a signal-to-noise ratio is greater than a first predetermined signal-to-noise ratio, an error rate of said encoded information is at or below a predetermined value, and if, during transmission of said encoded information, said signal-to-noise ratio is smaller than a second predetermined signal-to-noise ratio, said error rate of said encoded information becomes a value of one half (½), wherein said error rate is a ratio of the number of erroneous units of data to the total number of units of data transmitted, wherein said second predetermined signal-to-noise ratio is smaller than said first predetermined signal-to-noise ratio, and wherein said encoded information is to be superimposed with an interference signal to reduce said signal-to-noise ratio to be smaller than said second predetermined signal-to-noise ratio to cause said error rate of said encoded information to become a value of one half (½).

16. A reception device comprising:

a decoding unit configured to decode encoded information having following characteristics:

if, during transmission of said encoded information, a signal-to-noise ratio is greater than a first predetermined signal-to-noise ratio, an error rate of said encoded transmission information is at or below a predetermined value, and if, during transmission of said encoded information, said signal-to-noise ratio is smaller than a second predetermined signal-to-noise ratio, said error rate of said encoded information becomes a value of one half (½); and an interference signal generating means configured to generate an interference signal to be superimposed on said encoded information being transmitted, said interference signal reducing said signal-to-noise ratio to be smaller than said second predetermined signal-to-noise ratio to cause said error rate of said encoded information to become a value of one half (½), wherein said error rate is a ratio of the number of erroneous units of data to the total number of units of data transmitted, and wherein said second predetermined signal-to-noise ratio is smaller than said first predetermined signal-to-noise ratio.

* * * * *